Figure 1:
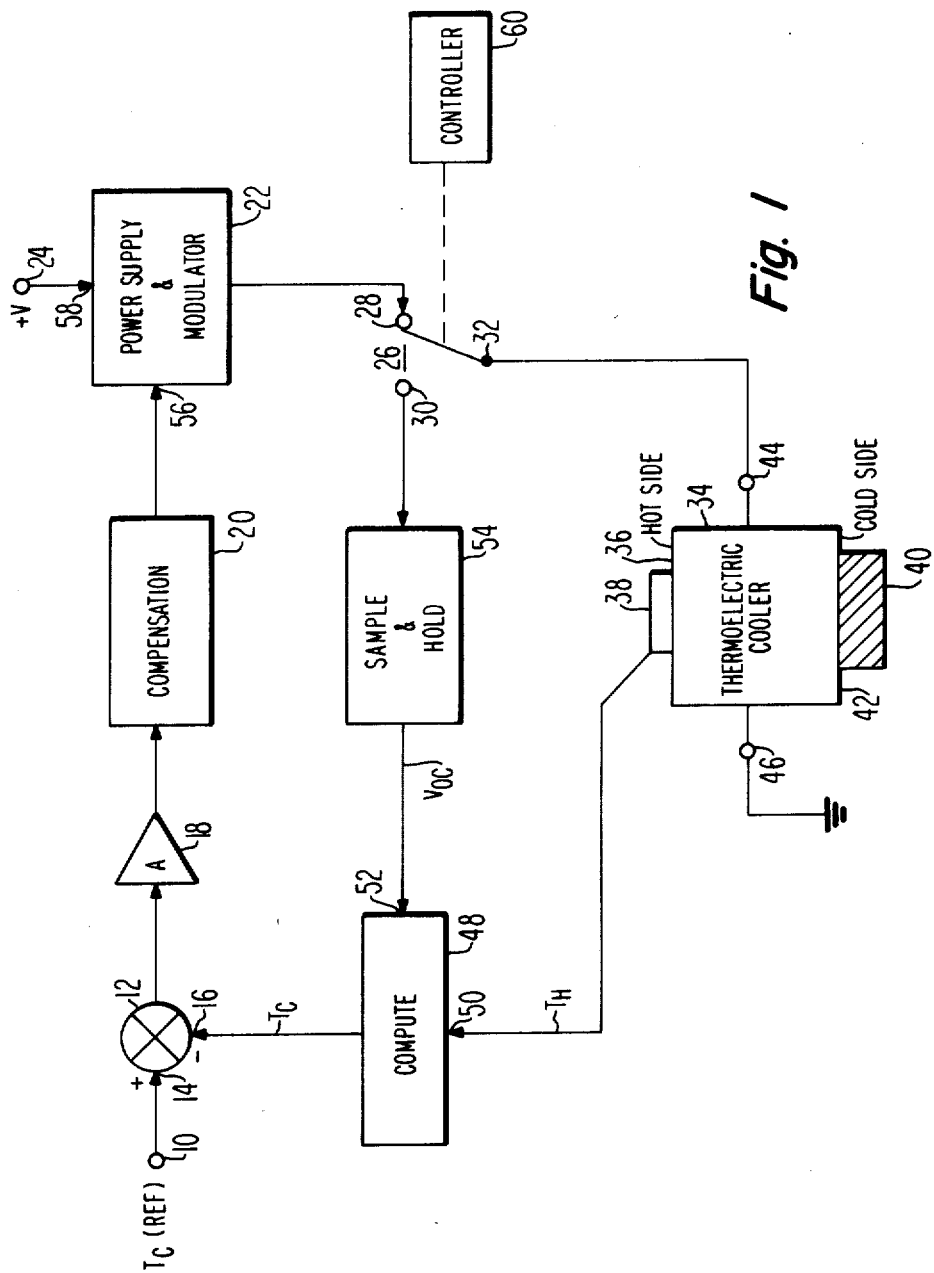

United States Patent [19]

Michaelis

[11] Patent Number: 4,639,883
[45] Date of Patent: Jan. 27, 1987

[54] THERMOELECTRIC COOLING SYSTEM AND METHOD

[75] Inventor: Theodore D. Michaelis, Medford, N.J.

[73] Assignee: RCA Corporation, Princeton, N.J.

[21] Appl. No.: 675,779

[22] Filed: Nov. 28, 1984

[51] Int. Cl.⁴ .................. F25B 21/02; G06F 15/32
[52] U.S. Cl. ........................................ 364/557; 62/3; 374/182
[58] Field of Search .................. 364/557; 322/2 R; 374/179, 180, 182, 170; 62/3; 136/201, 203; 73/338

[56] References Cited

U.S. PATENT DOCUMENTS

| 3,675,465 | 4/1972 | Sommer et al. | |
| 4,279,150 | 7/1981 | Land | 73/338 |
| 4,444,991 | 4/1984 | Beale | 136/201 |
| 4,490,982 | 1/1985 | Christmas | 62/3 |

Primary Examiner—Felix D. Gruber
Assistant Examiner—Daniel W. Juffernbruch
Attorney, Agent, or Firm—J. S. Tripoli; R. L. Troike; C. L. Maginniss

[57] ABSTRACT

A temperature-controlled thermoelectric cooling system regulates the flow of electric current into the thermoelectric cooler in order to maintain a desired cold-side temperature without directly measuring the temperature of the device affixed to the cold side of the cooler. The system includes an apparatus for periodically interrupting the current flowing to the cooler, and during these interruptions measuring the open circuit voltage across the cooler induced by the temperature difference between the hot and cold sides. Computational means use this voltage measurement in conjunction with the temperature of the hot side of the cooler to determine the cold side temperature. From the cold side temperature determination, a controller regulates the current flow to the cooler to maintain a desired cold side temperature.

22 Claims, 3 Drawing Figures

THERMOELECTRIC COOLING SYSTEM AND METHOD

This invention relates generally to thermoelectric cooling and, more particularly, to a temperature-controlled thermoelectric cooling system.

Thermoelectric cooling has as its origin the discovery in 1834 by a French watchmaker, Jean Peltier, that the passage of an electric current through the junction between two dissimilar conductors in a certain direction produces a cooling effect. There is a heating effect, unrelated to resistance heating, when the current is passed in the opposite direction. Peltier's experiments followed by thirteen years those of Thomas Seebeck, a German physicist, in which it was discovered that an electromotive force can be produced by heating a junction between two metals. I have combined these two effects in the making of the present invention.

Thermoelectric coolers are often employed to cool small electronic devices in order to improve device performance. For example, cooling an electromagnetic radiation sensor improves its signal-to-noise ratio. In the ideal situation, a temperature sensor is collocated with the device and produces a temperature-related electric signal which is fed back to control the input power to a thermoelectric cooler. The control may be effected in an on-off manner, as in a typical thermostat, or it may limit the current to the cooler in a continuous analog fashion to provide a more stable temperature condition. As an example, a silicon charge coupled detector array can incorporate a temperature sensing diode on the same wafer.

There are situations, however, where this relatively simple and desirable temperature sensing means is not available. For example, a lead salt detector, which is polycrystalline, cannot integrally incorporate a temperature sensing diode within the device itself, as is possible on a monocrystalline silicon chip. A separate, non-integral, temperature sensor requires additional undesired heat conduction paths to the cooled area.

In accordance with the principles of the present invention, an apparatus is disclosed for determining the temperature of the cold side of a thermoelectric cooler, the cooler having terminals adapted to receive an electric current therethrough. The apparatus comprises means for interrupting the electric current to the thermoelectric cooler. Means are provided for detecting the voltage induced across the terminals during those interruptions. The apparatus additionally includes means for sensing the temperature of the hot side of the thermoelectric cooler. Finally, there is provided means responsive to the sensing means and to the detecting means for computing the temperature of the cold side of the thermoelectric cooler.

Figure 2B:
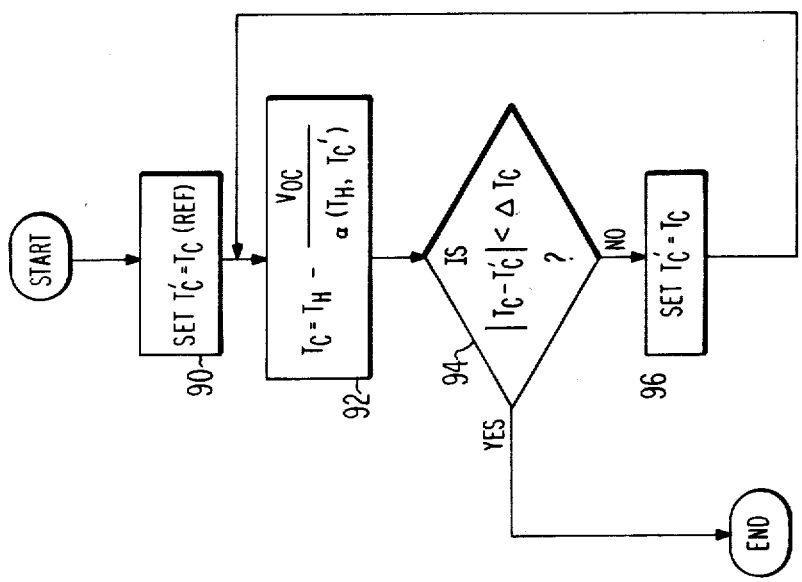
Figure 2A:
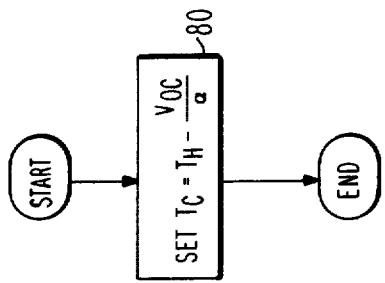

Other features and advantages of the present invention will be more fully understood from the following detailed description of the preferred embodiment, the appended claims, and the accompanying drawings, in which:

FIG. 1 illustrates in block diagram form a thermoelectric cooling system embodying the present invention; and FIGS. 2a and 2b are flow diagrams, respectively, of the simplified and iterative methods of computing temperature.

Refering to FIG. 1, there is shown a system for cooling a device 40 by thermoelectric cooler 34. Cooler 34 receives its electrical energy from power supply and modulator 22 which is controlled by subtracting circuit 12. Circuit 12 compares the temperature of the cold side 42 of thermoelectric cooler 34, i.e., the temperature of cooled device 40, with a reference temperature $T_C(REF)$. However, unlike conventional temperature-controlled cooling systems, in which the temperature of the cooled device is measured directly, the present invention finds application in those systems where it is highly inconvenient, or even impossible, to directly measure the temperature of the device. Therefore, an apparatus has been devised for computing the device temperature. The remainder of this discussion will present a detailed description of the apparatus of the present invention, the thermoelectric principles involved, and the application of those principles to the apparatus.

Power supply and modulator 22 receives at its input port 58 an dc voltage signal $+V$ which is applied at power input terminal 24. The dc voltage signal is modulated according to a control signal applied at input port 56. The modulating function of device 22 may be performed by a power transistor configured as a series regulator or, for a more efficient modulation, it may preferably be a pulse width modulator wherein the voltage level of the input control signal determines the width of the output signal current pulses.

The modulated signal is coupled to selectable contact 28 of switch 26. Although represented functionally as a two-position switch under the control of controller 60, which may, for example, be a microprocessor, switch 26 will be implemented in practice as a solid-state device, capable of very fast switching speeds. The common contact 32 of switch 26 is coupled via voltage terminal 44 to thermoelectric cooler 34. The other voltage terminal 46 of cooler 34 is coupled to a reference potential, ground in the present example, to complete the current path through supply 22 and cooler 34.

When performing its cooling function, thermoelectric cooler 34 has a cold side 42 and a hot side 36. A device 40 to be cooled is affixed to cold side 42 and, typically, a heat sink (not shown) contacts the hot side of cooler 34 to draw away the heat.

Temperature sensing device 38, typically a thermocouple, is affixed to hot side 36, and its signal leads carrying a signal representative of the temperature $T_H$ of hot side 36 is coupled to computing device 48 at input port 50. Computing device 48 may typically be a microprocessor having floating point multiplication capability such as Model GPC-86-532, sold by Microbar Systems, Inc., of Palo Alto, Calif. Device 48 computes the temperature $T_C$ of the cold side 42 of cooler 34 in either of two ways to be described later.

Contact 30, the other selectable contact of switch 26, is coupled to sample and hold circuit 54 whose output signal $V_{oc}$ is coupled to computing device 48 at input port 52. The output signal of device 48, representing $T_C$, is applied to the $(-)$ input port 16 of subtracting circuit 12. A reference signal, representing the desired cold side temperature, $T_C(REF)$, applied at reference terminal 10, is coupled to the $(+)$ input port 14 of subtracting circuit 12.

The output signal from circuit 12 is coupled through amplifier 18 and compensation circuit 20 to the control signal input port 56 of modulator 22. Amplifier 18 provides the necessary current boost and circuit 20 provides an increased low frequency response of the amplifier 18 output signal to the modulator 22 control input. Compensation circuit 20 may typically comprise an operational amplifier having frequency dependent elements in a feedback loop coupled between the amplifier output port and its inverting input port.

When switch 26 is positioned differently from that shown, with common contact 32 connected with selectable contact 30, the voltage terminals 44 and 46 of cooler 34 are open circuited, and the Seebeck effect may be observed. That is, there will be a dc voltage developed between terminals 44 and 46, which voltage is related to the difference in temperature between hot side 36 and cold side 42.

In the practice of the present invention, controller 60 manipulates switch 26 such that for the majority of the time, electrical current is supplied to cooler 34 from supply and modulator 22. However, controller 60 periodically causes switch 26 to open voltage terminal 44 from supply 22 for short intervals of time and to couple it to sample and hold circuit 54. During these short time intervals, sample and hold circuit 54 stores the open circuit voltage level of cooler 34 and applies it to input port 52 of computing device 48. Since a thermoelectric cooler typically contains virtually no electrical energy storage, these intervals may be as short as ten microseconds. It is desirable to keep these intervals as short as possible, so as to maintain an electrical current to cooler 34 which is relatively constant; nevertheless, the temperature of a conventional size and mass cooler will not change appreciably during such a small time interval.

It has now been shown the manner by which temperature $T_H$ of the hot side 36 of cooler 34 and the open circuit voltage $V_{oc}$ of cooler 34 are applied to computing device 48. Device 48 then computes the temperature $T_C$ of the cold side 42 of cooler 34 according to the equations developed in the paragraphs which follow.

The thermoelectric cooler equation is $$T_H - T_C = (1/\alpha)(V - IR), \tag{1}$$

where $\alpha$ is the Seebeck coefficient, V is the applied voltage, I is the current through the cooler, and R is its resistance. When the cooler is open-circuited, a voltage $V_{oc}$ is produced across the cooler terminals which is proportional to $T_H - T_C$, that is, $$V_{oc} = (T_H - T_C). \tag{2}$$

Solving for $T_C$, $$T_C = T_H - (V_{oc}/\alpha). \tag{3}$$

FIG. 2a depicts Equation (3) as the sole computational step performed by computing device 48. Execution of Equation (3) by the Microbar Systems microprocessor mentioned earlier would additionally require a look-up table, such as a ROM, having the necessary values of $\alpha$.

Whereas the FIG. 2a computational step gives adequate results for many temperature-controlled cooling applications, more precise and accurate results may be obtained by recognizing that the Seebeck coefficient, while predominantly a function of the types of electrical conductors of the cooler, is also a slight function of the temperatures of the hot and cold sides of the cooler. Thus, Equation (3) might be more accurately expressed as $$T_C = T_H - V_{oc}/\alpha(T_H, T_C). \tag{3a}$$

The solution to Equation (3a) requires an iterative procedure, since the solution for $T_C$ depends on $T_C$ itself. One such iterative approach, which may be performed by computing device 48, is shown in flow diagram form in FIG. 2b. The procedure begins at step 90 where $T_C'$, a temporary value of the cold side temperature, is initialized to some arbitrary value, $T_C(REF)$ in the present example. At step 92, a value of $T_C$ is computed, using a value of the Seebeck coefficient, $\alpha$, as a function $T_C'$. At step 94 an inquiry is made as to whether the computed value of $T_C$ is sufficiently close to the value of $T_C'$ used in the computation of $T_C$. This inquiry takes the form of determining if the difference between $T_C$ and $T_C'$ is less than an arbitrarily chosen limit, $\Delta T_C$ in the present example. If the difference is too great, the "NO" exit is taken, and step 96 sets the temporary cold side temperature, $T_C'$ equal to the most recently computed value of $T_C$, and the computation is repeated at step 92. Once a value of $T_C$ is found which is sufficiently close to $T_C'$, the "YES" exit from step 94 is taken and the procedure is complete. Execution of the process of Equation (3a) would require a two-dimensional look-up table ROM for the values of $\alpha$.

The present invention is not limited to a cooling system having a single thermoelectric cooler. In the case where cooler 34 comprises n stages connected in series, Equation (3) becomes $$T_C = T_H - V_{oc}/n\alpha. \tag{4}$$

If the n coolers are not series connected, the individual stages can be open-circuited and their respective open-circuit voltages sampled and held and then added, and Equation (4) still applies.

While the principles of the present invention have been demonstrated with particular regard to the illustrated structure and method of the figures, it will be recognized that various departures from such illustrative structure and method may be undertaken in practice of the invention. For example, the principles taught in this disclosure are not limited merely to cooling systems. It is easily seen that if the current through cooler 34 from supply and modulator 22 were to be reversed, cooler 34 would become a heater, device 40 would be heated, and the system of FIG. 1 would provide temperature-controlled heating without the need for directly measuring the temperature of the heated device 40. The scope of this invention is not intended to be limited to the structure and method disclosed herein but should instead be gauged by the breadth of the claims which follow.

What is claimed is:

1. An apparatus for determining the temperature of the cold side of a thermoelectric cooler, said cooler having terminals adapted to receive electric current therethrough, said apparatus comprising:
   means for interrupting said electric current to said thermoelectric cooler;
   means for detecting the voltage induced across said terminals during said interruption;
   means for sensing the temperature of the hot side of said thermoelectric cooler; and
   means responsive to said sensing means and said detecting means for computing the temperature of said cold side of said thermoelectric cooler.

2. The apparatus according to claim 1 in which said computing means computes the temperature of said cold side according to $$T_C = T_H - V_{oc}/\alpha,$$

where $T_C$ is the temperature of said cold side, $T_H$ is the temperature of said hot side, $V_{oc}$ is the voltage detected across said terminals, and $\alpha$ is the Seebeck coefficient of said cooler.

3. The apparatus according to claim 2 in which said computing means computes the temperature of said cold side using a Seebeck coefficient which is a function of $T_C$, and wherein said computing means iteratively computes a value of $T_C$ using a Seebeck coefficient which is a function of the immediately preceding computed value of $T_C$.

4. The apparatus according to claim 3 in which said computing means iteratively computes values of $T_C$ until the difference between a computed value of $T_C$ and the immediately preceding computed value of $T_C$ is less than a predetermined value.

5. The apparatus according to claim 1 in which said means for interrupting interrupts said electric current for ten microseconds.

6. The apparatus according to claim 1 in which said detecting means comprising a sample and hold circuit.

7. The apparatus according to claim 1 in which said sensing means includes a thermocouple.

8. A thermoelectric cooling system including:
 means for providing electric current;
 a thermoelectric cooler having a cold side and a hot side and having terminals for receiving said electric current therethrough, said electric current being applied to said terminals such that said current flows through said thermoelectric cooler in a direction so as to maintain said cold side at a temperature lower than said hot side, said thermoelectric cooler being adapted to be affixed at its cold side to a workpiece;
 means for sensing the temperature at said hot side of said thermoelectric cooler;
 means for periodically interrupting said electric current supplied to said thermoelectric cooler;
 means for detecting the voltage across said terminals during said interruptions, said voltage being induced by the difference in temperature between hot side and said cold side;
 means responsive to said sensing means and to said detecting means for computing the temperature of said cold side of said thermoelectric cooler; and
 means coupled to said source of electric current and responsive to said computing means for controlling said flow of electric current.

9. The system according to claim 8 in which said computing means computes the temperature of said cold side according to $$T_C = T_H - V_{oc}/\alpha,$$

where $T_C$ is the temperature of said cold side, $T_H$ is the temperature of said hot side, $V_{oc}$ is the voltage detected across said terminals, and $\alpha$ is the Seebeck coefficient of said cooler.

10. The system according to claim 9 in which said computing means computes the temperature of said cold side using a Seebeck coefficient which is a function of $T_C$, and wherein said computing means iteratively computes a value of $T_C$ using a Seebeck coefficient which is a function of the immediately preceding computed value of $T_C$.

11. The system according to claim 10 in which said computing means iteratively computes values of $T_C$ until the difference between a computed value of $T_C$ and the immediately preceding computed value of $T_C$ is less than a predetermined value.

12. The system according to claim 8 in which said means for interrupting interrupts said electric current for ten microseconds.

13. The system according to claim 8 in which said detecting means comprises a sample and hold circuit.

14. The system according to claim 8 in which said sensing means includes a thermocouple.

15. A method for determining the temperature of the cold side of a thermoelectric cooler having electric current supplied through terminals thereof, said method comprising the steps of:
 a. interrupting said electric current to said thermoelectric cooler;
 b. detecting the voltage induced across said terminals during said interruption;
 c. sensing the temperature of the hot side of said thermoelectric cooler; and
 d. computing the temperature of said cold side of said thermoelectric cooler from said detected voltage and said sensed hot side temperature.

16. The method according to claim 15 in which the temperature of said cold side is computed during said computing step according to $$T_C = T_H - V_{oc}/\alpha,$$

where $T_C$ is the temperature of said cold side, $T_H$ is the temperature of said hot side, $V_{oc}$ is the voltage detected across said terminals, and $\alpha$ is the Seebeck coefficient of said cooler.

17. The method according to claim 16 in which the temperature of said cold side is computed during said computing step using a Seebeck coefficient which is a function of $T_C$, and wherein said computing step iteratively computes a value of $T_C$ using a Seebeck coefficient which is a function of the immediately preceding computed value of $T_C$.

18. The method according to claim 17 in which said computing step iteratively computes values of $T_C$ until the difference between a computed value of $T_C$ and the immediately preceding computed value of $T_C$ is less than a predetermined value.

19. A method for controlling the temperature of the cold side of a thermoelectric cooler comprising the steps of:
 a. supplying electric current through terminals of said thermoelectric cooler;
 b. periodically interrupting said electric current to said thermoelectric cooler;
 c. detecting the voltage induced across said terminals during said interruption;
 d. sensing the temperature of the hot side of said thermoelectric cooler;
 e. computing the temperature of said cold side of said thermoelectric cooler from said detected voltage and said sensed hot side temperature;
 f. comparing said computed cold side temperature with a reference temperature; and
 g. controlling said electric current supplied to said thermoelectric cooler in response to said comparison.

20. The method according to claim 19 in which the temperature of said cold side is computed during said computing step according to $$T_C = T_H - V_{oc}/\alpha,$$

where $T_C$ is the temperature of said cold side, $T_H$ is the temperature of said hot side, $V_{oc}$ is the voltage detected across said terminals, and $\alpha$ is the Seebeck coefficient of said cooler.

21. The method according to claim 20 in which the temperature of said cold side is computed during said computing step using a Seebeck coefficient which is a function of $T_C$, and wherein said computing step iteratively computes a value of $T_C$ using a Seebeck coefficient which is a function of the immediately preceding computed value of $T_C$.

22. The method according to claim 21 in which said computing step iteratively computes values of $T_C$ until the difference between a computed value of $T_C$ and the immediately preceding computed value of $T_C$ is less than a predetermined value.

* * * * *